United States Patent
John et al.

(10) Patent No.: US 10,447,494 B2
(45) Date of Patent: *Oct. 15, 2019

(54) SYSTEM AND METHOD FOR A FEDERATED EVOLVED PACKET CORE SERVICE BUS

(71) Applicant: Futurewei Technologies, Inc., Plano, TX (US)

(72) Inventors: Kaippallimalil Mathew John, Richardson, TX (US); Khosrow Tony Saboorian, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,294

(22) Filed: Sep. 26, 2017

(65) Prior Publication Data
US 2018/0019893 A1    Jan. 18, 2018

Related U.S. Application Data

(63) Continuation of application No. 14/801,150, filed on Jul. 16, 2015, now Pat. No. 9,780,963.

(Continued)

(51) Int. Cl.
*H04L 12/40* (2006.01)
*H04W 4/02* (2018.01)
(Continued)

(52) U.S. Cl.
CPC ............ *H04L 12/40* (2013.01); *H04L 12/403* (2013.01); *H04L 12/4633* (2013.01); *H04L 12/6418* (2013.01); *H04W 4/02* (2013.01)

(58) Field of Classification Search
CPC ... H04L 12/40; H04L 12/403; H04L 12/4633; H04L 12/6418; H04L 41/0823; H04W 4/02
See application file for complete search history.

(56) References Cited

U.S. PATENT DOCUMENTS

2007/0291770 A1* 12/2007 Kitazoe ............... H04J 11/0093
370/395.52
2009/0064271 A1   3/2009 Ng et al.
(Continued)

FOREIGN PATENT DOCUMENTS

CN    101052206 A    10/2007
CN    101272618 A    9/2008
(Continued)

OTHER PUBLICATIONS

Andersson, J., et al., "Architectural EPC Extensions for Supporting Heterogeneous Mobility Schemes—Mevico," Version 0.1, Celtic Telecommunication Solutions, Jan. 2013, 94 pages.
(Continued)

*Primary Examiner* — Mohamed A Kamara
(74) *Attorney, Agent, or Firm* — Slater Matsil, LLP

(57) ABSTRACT

A system and method of provides services including a federated service bus between distributed and evolved packet core (EPC) and a radio access network (RAN), wherein the federated service bus provides information based on a parent-child relationship between the EPC and RAN on a per-federated service basis. The information can include loading and location information.

17 Claims, 13 Drawing Sheets

Related U.S. Application Data

(60) Provisional application No. 62/025,678, filed on Jul. 17, 2014.

(51) Int. Cl.
 *H04L 12/403* (2006.01)
 *H04L 12/46* (2006.01)
 *H04L 12/64* (2006.01)

(56) References Cited

U.S. PATENT DOCUMENTS

| | | | |
|---|---|---|---|
| 2010/0124223 A1 | 5/2010 | Gibbs et al. | |
| 2010/0271949 A1* | 10/2010 | Yoon | H04W 8/12 370/235 |
| 2012/0185913 A1 | 7/2012 | Martinez et al. | |
| 2013/0254328 A1 | 9/2013 | Inoue et al. | |
| 2013/0259006 A1 | 10/2013 | Khan et al. | |
| 2014/0146673 A1 | 5/2014 | Parker | |
| 2018/0309681 A1 | 10/2018 | Dahod et al. | |

FOREIGN PATENT DOCUMENTS

| | | |
|---|---|---|
| CN | 102217275 A | 10/2011 |
| CN | 103380640 A | 10/2013 |
| CN | 104137518 A | 11/2014 |
| EP | 2198579 B1 | 1/2011 |
| EP | 2544135 | 1/2013 |
| EP | 2404405 B1 | 11/2017 |
| JP | 2015517232 A | 6/2015 |
| WO | 2010145685 A1 | 12/2010 |
| WO | 2013126292 A1 | 8/2013 |
| WO | 2013144747 A1 | 10/2013 |
| WO | 2013149637 A1 | 10/2013 |
| WO | 2013164474 | 11/2013 |

OTHER PUBLICATIONS

Gomez, K., et al., "FME: A Flexible Management Entity for virtualizing LTE Evolved Packet Core," 2014 IEEE Networ Operations and Management Symposium (NOMS), May 5-9, 2014, 4 pages.

Olsson et al, "EPC & 4G Packet Networks," 2nd Edition, published 2013.

Taleb, T., "Toward Carrier Cloud: Potential Challenges and Solutions", IEEE Wireless Commun., vol. 21, No. 3, pp. 80-91, Jun. 2014.

3GPP TSG-CT WG4#66 C4-141319, "SGW/PGW selection with GTP-C node level load control", Alcatel-Lucent, Alcatel-Lucent Shanghai Bell, Verizon, Cisco, CT4, Jul. 14-18, 2014, 8 pages, Cape Town, South-Africa.

* cited by examiner

SYSTEM AND METHOD FOR A FEDERATED EVOLVED PACKET CORE SERVICE BUS

This application is a continuation of U.S. application Ser. No. 14/801,150, entitled "System and Method for a Federated Evolved Packet Core Service Bus", filed Jul. 16, 2015, which claims the benefit of U.S. Provisional Application No. 62/025,678, entitled "System and Method for a Federated Evolved Packet Core Service Bus", filed on Jul. 17, 2014, each application is hereby incorporated herein by reference.

TECHNICAL FIELD

The present invention relates to a system and method for network communications, and, in particular embodiments, to a system and method for a federated evolved packet core service bus.

BACKGROUND

Applications, such as content delivery networks (CDNs) and the like can benefit from obtaining congestion information, loading of networks, user equipment (UE) location and other services. Current evolved packet core (EPC) networks can use protocol-based interfaces to provide such services to applications. For example, the Rx interface within the diameter protocol allows an application to request quality of service (QoS) to the policy and charging rules function (PCRF) of an EPC network. However, even for load information exchange among EPC functions an extension is needed to the general packet radio service (GPRS) tunneling protocol (GTP). Example EPC functions include packet data network (PDN) gateways (PGWs), serving gateways (SGWs), and mobility management entities (MMEs). Such extensions are only usable if the application complies with the aspects of the complex protocol (GTP, Diameter, etc.). However, many applications do not have facilities to handle such complex protocols and, for factors such as network loading that require constant updating, such protocols would require significant bandwidth.

SUMMARY

In an embodiment of the present invention, a method for providing services includes providing a federated service bus between distributed and evolved packet core (EPC) and a radio access network (RAN), wherein the federated service bus provides information based on a parent-child relationship between the EPC and RAN on a per-federated service basis.

In another embodiment of the present invention, a method for providing services includes providing a first service bus in communication with a plurality of radio access network functional components. A second service bus is provided that is in communication with a plurality of evolved packet core functional components. A federation bus is provided between the first service bus and second service bus. First information from the radio access network functional components is provided to the second service bus. In addition second information from the evolved packet core functional components is provided to first service bus.

Another embodiment of the present invention includes a federated service bus including at least one processor and at least one non-transitory computer readable storage medium storing programming for execution by the at least one processor. The programming includes instructions to provide a federated service bus between an evolved packet core (EPC) and a radio access network (RAN), wherein the federated service bus provides information based on a parent-child relationship between the EPC and RAN on a per-federated service basis.

Another embodiment of the present invention provides a federated service bus including a first service bus in communication with a plurality of radio access network functional components. A second service bus is provided in communication with a plurality of evolved packet core functional components. A federation bus between the first service bus and second service bus is provided, wherein first information from the radio access network functional components is provided to the second service bus and second information from the evolved packet core functional components is provided to first service bus.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
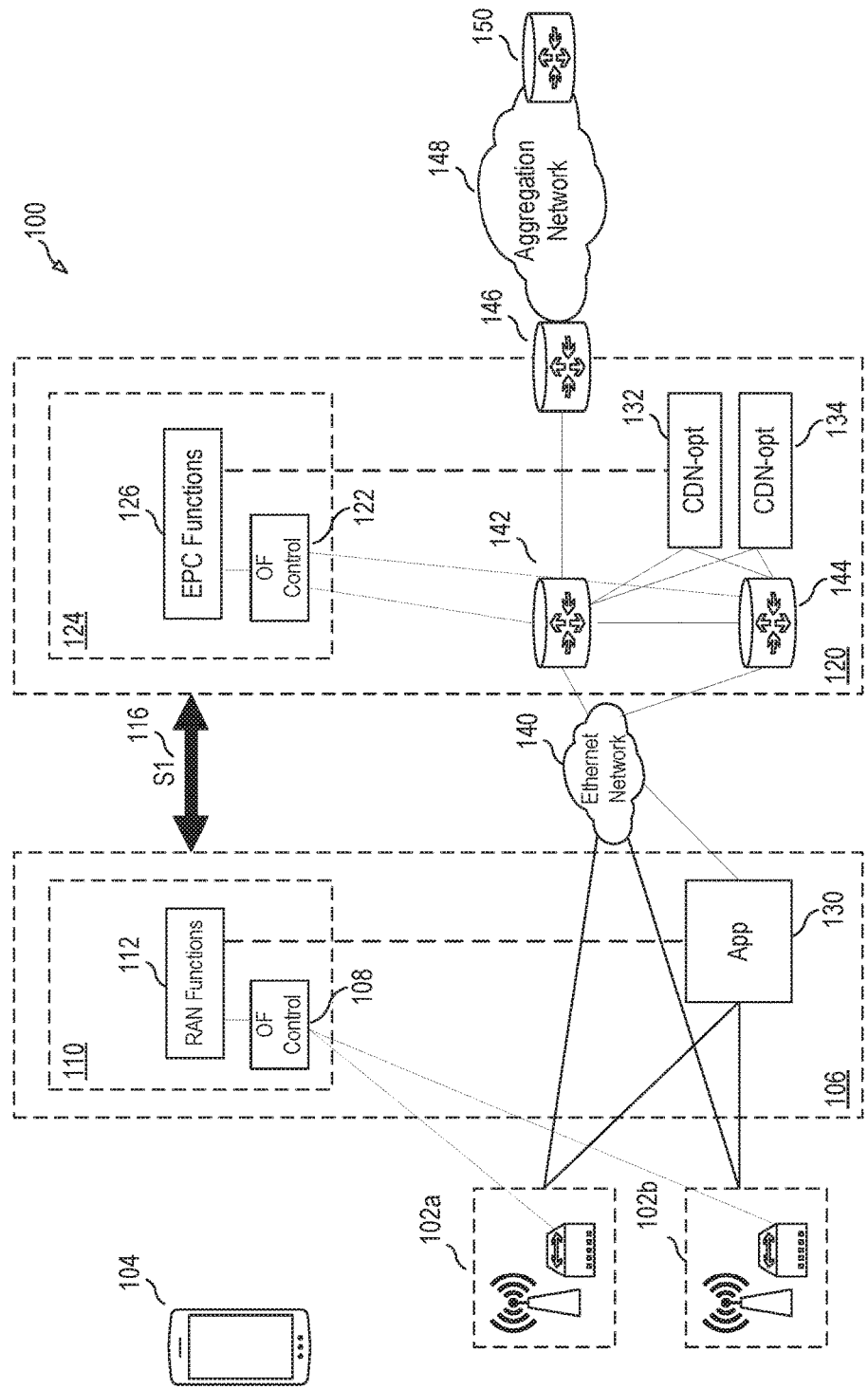
FIG. 1 shows a wireless access configuration on the LTE model.

FIG. 1 shows a simplified wireless access configuration on the LTE model. Access network 100 includes radio transceivers 102a and 102b, which are configured to communicate with UE 104. Radio transceivers 102a and 102b communicate to radio access network (RAN) 106 in two ways. First, a direct connection is provided to OpenFlow (OF) controller 108. OF controller 108 controls RAN OF backhaul platform 110, which serves as a platform for the RAN backhaul 112 operating as software defined elements. Transceiver 102a, transceiver 102b and RAN 106, for example, are part of an E-UTRAN configuration as defined by 3GPP TS 36.300, entitled Evolved Universal Terrestrial Radio Access (E-UTRA) and Evolved Universal Terrestrial Radio Access Network (E-UTRAN), which is hereby incorporated by reference into this specification in its entirety).

RAN 106 is connected to evolved packet core (EPC) 120 using S1 protocols 116 as defined by the 3GPP. As with RAN 106, EPC 120 is configured in a software defined configuration with OF controller 122 controlling EPC OF platform 124, which supports EPC functions 126. In this example, the EPC functions include the functions defined for an EPC by the 3GPP TS 23.402 which is hereby incorporated by reference into this specification in its entirety). Specific functions may include, but are not limited to, the mobility management entity (MME), packet data network (PDN) gateway (PGW) and home subscriber server (HSS).

In addition to the core LTE functionality of RAN 106 and EPC 120 described above, both RAN 106 and EPC 124 may include applications for additional functionality in the control plane. App 130 maybe a load balancer or another function. In FIG. 1, EPC 120 includes two content data network (CDN) optimizers 132 and 134. The CDNs optimize the use of cloud processing and storage for the delivery of content to UEs. These functions (App 130 and CDNs 132 and 134) communicate with the RAN functions 112 and the EPC functions 126. In addition, using the control plane, these functions communicate with radio transceivers 102a and 102b, and with external networks using a network consisting of local Ethernet network 140, gateways 142, 144 and 146, aggregation network 148, and gateway 150. However, using prior techniques, there is no efficient way for applications in the EPC 120 to access data involving the RAN functions 112 or for applications running in the RAN 106 to access data involving the EPC functions 126.

Figure 2:
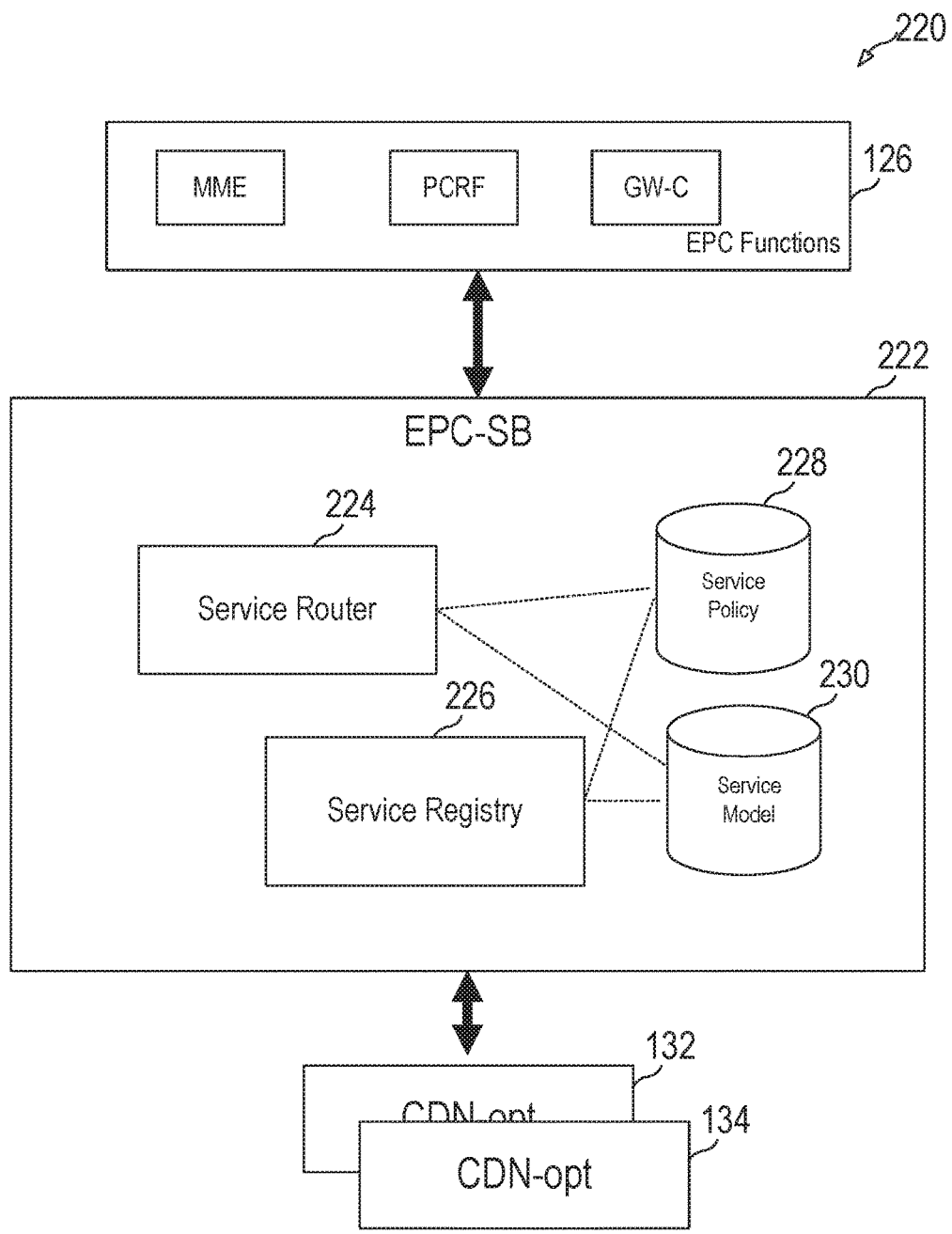
FIG. 2 shows an embodiment of the present invention that provides a subscriber bus in an EPC 220.

FIG. 2 shows an embodiment of the present invention that provides a subscriber bus in an EPC 220. The EPC service bus (EPC-SB) is a loosely coupled, service oriented architecture to exchange information (publish/subscribe/notify and request/response) between EPC/RAN and an application. Examples of services include: UE location information, network load information, and cell congestion. The federation of the service bus is supported with a parent-child relationship per service. That is, producers of info register with the parent. Then, consumers of the information subscribe to the parent, or if federated they subscribe to the child (which acts as a broker to obtain the info from the parent). As examples, the EPC-SB would be the parent for UE location service, while, for cell congestion service, the RAN service bus (RAN-SB) would be the parent.

As with EPC 120 (FIG. 1), EPC 220 includes EPC functions 126 and CDN optimizers 132 and 134. However, EPC 220 includes EPC service bus (EPC-SB) 222. EPC-SB 222 provides a mechanism to expose capabilities on a per service basis (that is, the application does not need to implement any other details), as well as a messaging system by which these capabilities/services can be provided. EPC-SB 222 includes a service router 224 and a service registry 226. In addition, EPC-SB includes a service policy store 228 and a service model store 230. EPC-SB operates on a subscription basis. That is, an application subscribes to the load information for a cell that is regularly gathered and stored from the EPC functions 126 and the subscribing entity is notified on regular basis of this information.

Figure 3:
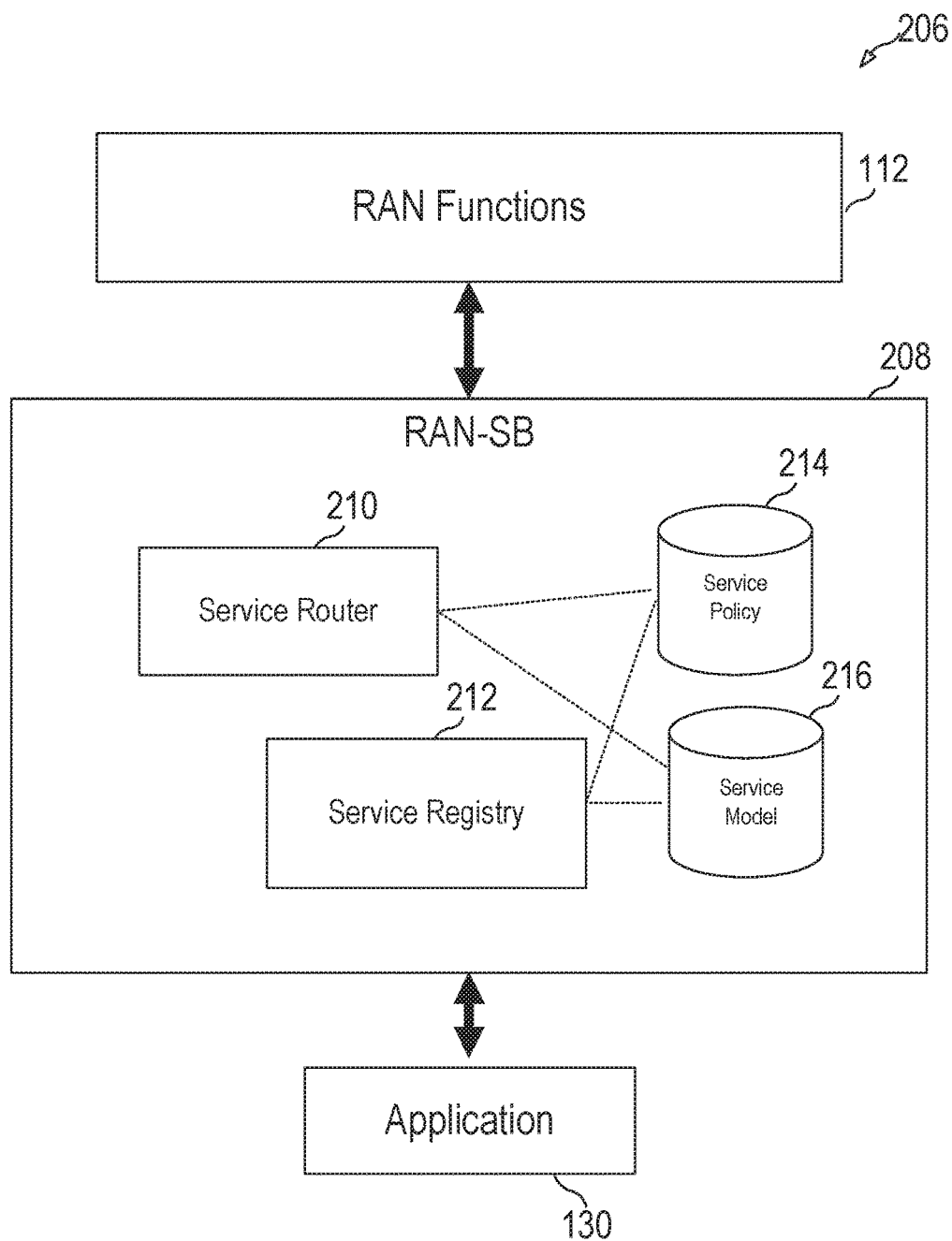
FIG. 3 shows an embodiment of the present invention that provides a subscriber bus in an RAN 220.

FIG. 3 shows an embodiment of the present invention that provides a subscriber bus in an RAN 220. Similarly to EPC 220, RAN 206 includes RAN functions 112 and application 130 as in RAN 106 (FIG. 1). In addition, RAN 206 includes RAN service bus (RAN-SB) 208. As with EPC-SB 222, RAN-SB 208 includes a service router 210 and a service registry 212. In addition, RAN-SB includes a service policy store 214 and a service model store 216. As with EPC-SB 222, RAN-SB 208 operates on a subscription basis.

Figure 4:
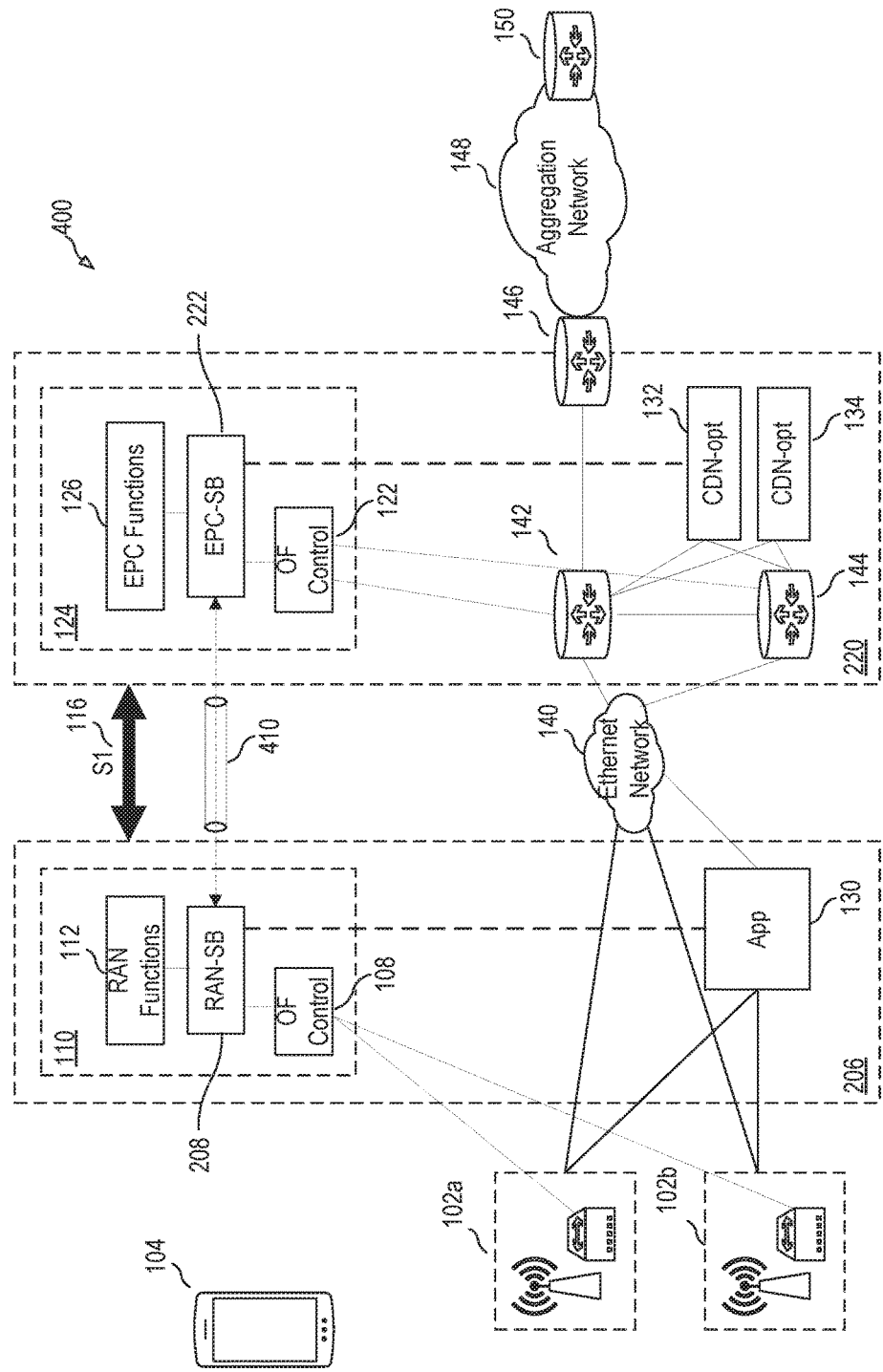
FIG. 4 shows an embodiment of the present invention including a federated service bus.

FIG. 4 shows an embodiment of the present invention including a federated service bus. In network 400, items bearing numbers from FIG. 1-3 provide the functions described in those figures. In addition, RAN-SB 208 and EPC-SB 222 are connected by federation bus 410. Together, RAN-SB 208, EPC-SB 222 and federation bus 410 combine to function as a federated bus. This allows functions in RAN 206 to subscribe to information in that EPC 220 allows to be exposed and vice-versa. The federation of EPC-SB 222 and RAN-SB 208 exposes various services to applications, such as intelligent domain name server (iDNS), content network proxy, etc. This allows those applications to provide different services, including radio/cell location information for an internet protocol (IP) flow or connection, an out-of-band service mechanism to return radio network location information for an IP flow/connection, and radio/cell load information. This provides a federation of services between distributed EPC and RAN sites with a parent-child relationship on a per-federated service basis.

Applications such as iDNS, content delivery, and other emerging applications can benefit from understanding the radio network location for an IP flow and congestion level in radio networks. It is also understood that placing proxies close to the RAN network can improve the CDN service delivered. Such proxies use heuristics based on round trip time (RTT), IP address locality, and other aggregate information to derive a personalized and optimal content delivery service. An application such as CDN proxy can use cell load and explicit congestion information (ECN) (congestion experience (CE) information) on a traffic path to determine the best way to deliver content to a user.

However, using prior techniques, there are no well-defined mechanisms to provide cell congestion feedback to such applications. Prior techniques require modification or encapsulation in each traffic packet. The embodiment of FIG. 4 provides an out-of-band mechanism to return, for example, radio network location information for IP flow/connection or cell load information. To access this information, an application subscribes to the information for a cell and is notified on regular basis.

Figure 5:
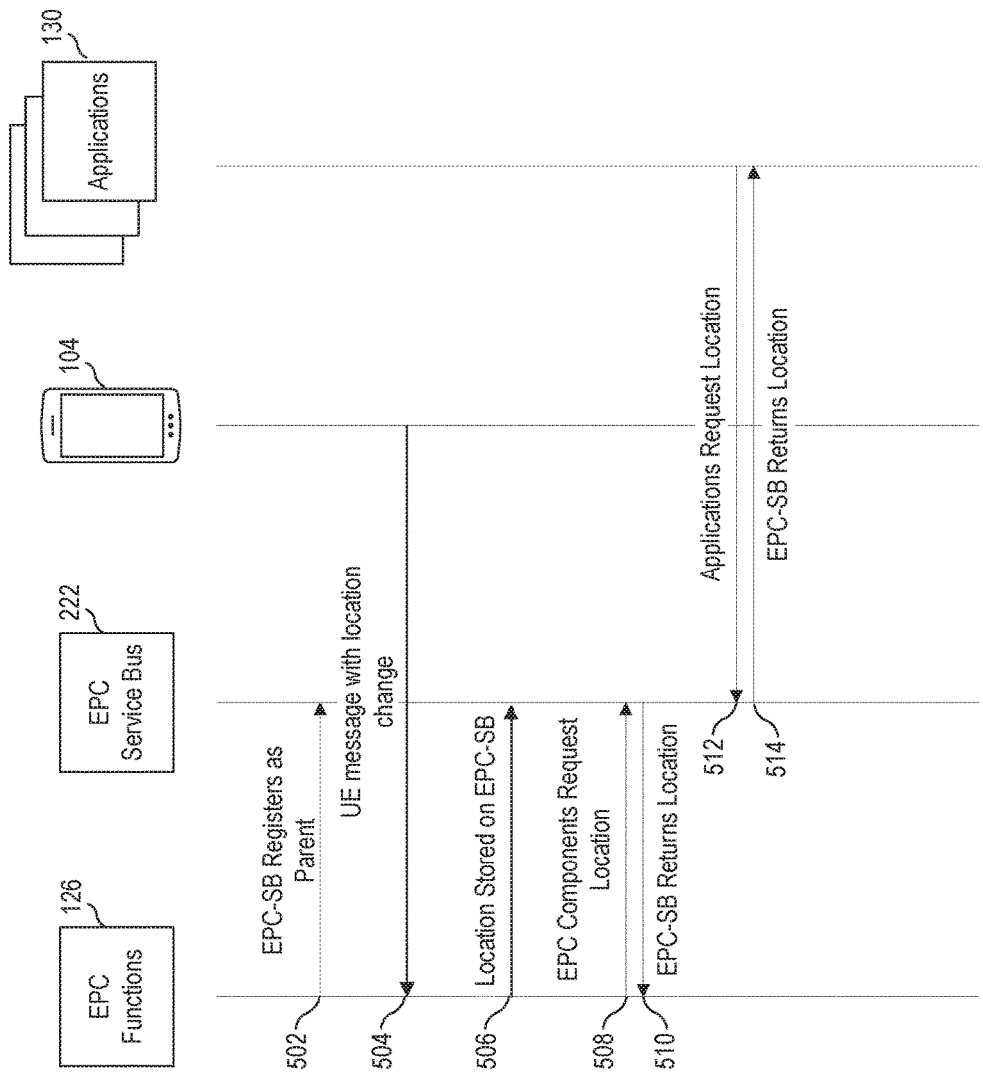
FIG. 5 is a process flow diagram showing a method embodiment that provides user equipment (UE) location service that allows an application to obtain the 3GPP location information of a UE, given the IP address of the flow.

FIG. 5 is a process flow diagram showing a method embodiment that provides user equipment (UE) location service that allows an application to obtain the 3GPP location information of a UE, given the IP address of the flow. In step 501, the EPC-SB 222 registers as the parent (<UE-Location-Service>) and makes the service available to the RAN 206 and EPC 220. In step 504, one of several types of messages from UE 104 (Attach, TAU/RAU Request, Path Switch Request, Handover Notify) trigger EPC 220 (MME)

to publish the location of UE 104 (<UE-Location-Service> (op=INSERT, key=UE IMSI, MSISDN, location=cell id, TA/RA id, {list IP/PDN address}). Because EPC-SB 222 is registered as a parent for this information, the location information is stored in EPC-SB 222 in step 506. In step 508, if an EPC function 126 subscribes to the location information, the EPC-SB will return the information in step 510. More importantly, components outside of the EPC functions 126 can subscribe using federated bus 410. In step 512, an application such as application 130 subscribes to the location information that the EPC-SB 222 federates and exposes to application 130 through RAN-SB 208. Other applications (e.g. iDNS, CDN optimizer) that request for location information with similar semantics (<UE-Location-Service> (op=REQUEST, IP-prefix=IPx). EPC-SB returns <UE-Location-Service> (op=RESPONSE, IP-prefix=IPx, TA=ta1, cell-id=c1, . . . ). Publish/Subscribe/Notify based <UE-Location-Service>) may also be enabled. Applications may use the TA, cell-id and other configured topology and load info to select appropriate gateways, servers, etc. Of importance, transferring this information does not require the use of complex protocol extensions or burden the primary data plane or control plane functions of network 400.

Figure 6:
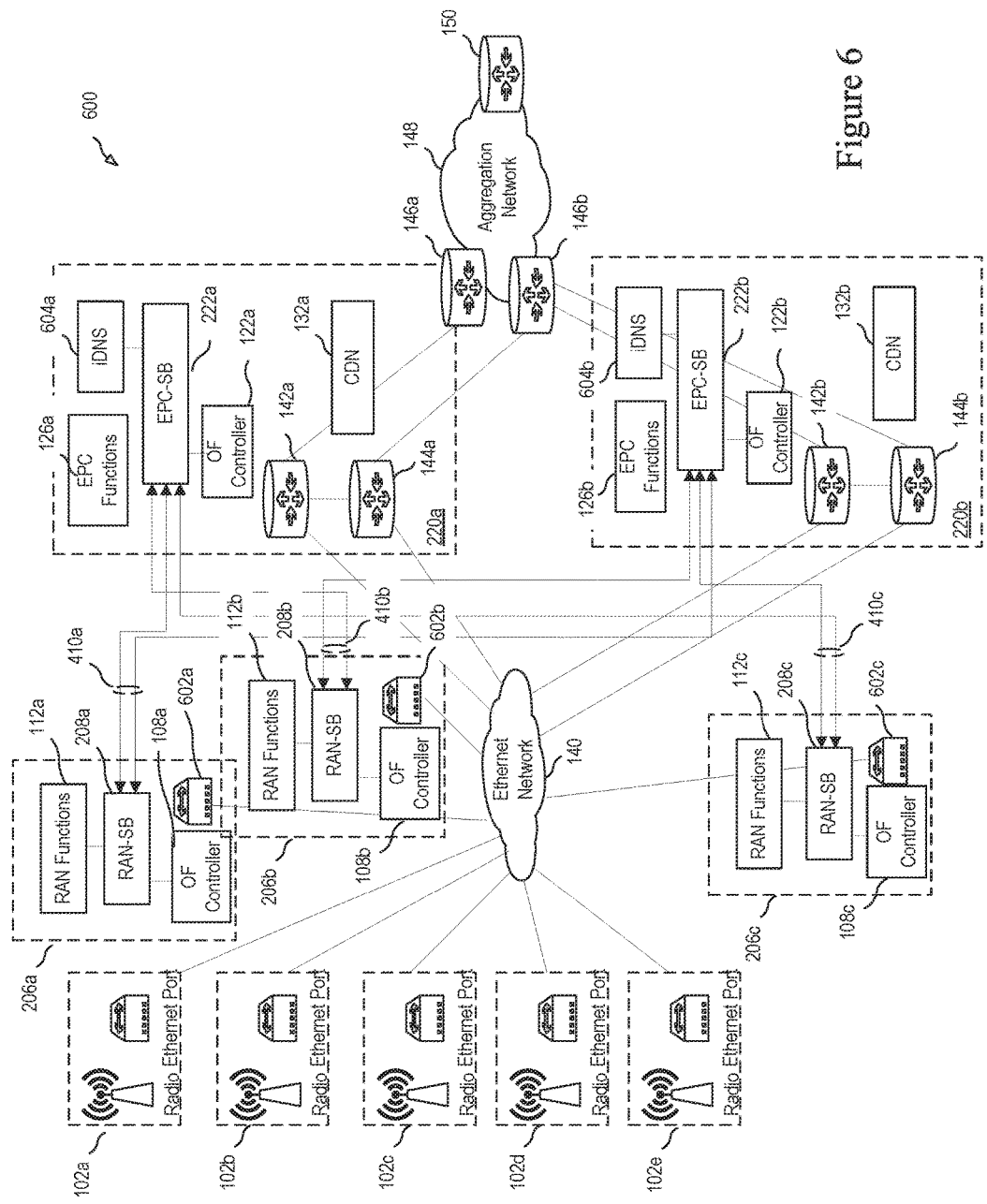
FIG. 6 is an illustration of another embodiment of the present invention in a more complex network including multiple EPCs.

FIG. 6 is an illustration of another embodiment of the present invention in a more complex network including multiple EPCs. In a distributed architecture where there are multiple EPC sites that RAN networks can home to, a mechanism is needed by which a RAN network can select one out of many EPC sites for each new session that is being established. Using prior technology, there may be multiple MMEs (potentially distributed) that can direct the attach/ session setup request. The distribution among multiple MMEs is usually based on weighted configuration in a DNS on a tracking area code (TAC). However, these mechanisms are relatively static and do not account for dynamic load on each MME/associated EPC servers. In a largely centralized EPC (as in current deployments), this method can work well. However, in highly distributed EPC networks, more dynamic methods are needed. In addition to effective load balancing, geographical redundancy can benefit from such methods. The embodiment of FIG. 6 how the present invention provides these benefits.

Network 600 includes five transceivers 102a-e. Any of these transceivers may utilize one of three RANs 206a-c. Each of RANs 206a-c includes RAN functions 112a-c, respectively, RAN-SBs 208a-c, respectively, OF controllers 108a-c, respectively, and Ethernet ports 602a-c, respectively. All of transceivers 102a-e and Ethernet ports 602a-c connect to local Ethernet 140. In addition, two EPCs 220a-b are provided. Both of EPCs 220a-b include EPC functions 126a-b, respectively, EPC-SBs 222a-b, respectively, OF controllers 122a-b, respectively, gateways 142a-b and 144a-b, respectively and CDN optimizers 132a-b, respectively. Gateways 142a-b connect to the aggregation network 148 via gateway 146a and gateways 144a-b connect to aggregation network 148 via gateway 146b. In addition, each of EPCs 220a-b includes an intelligent internal domain name servers (iDNSs) 604a-b. A typical DNS includes a relatively fixed mapping for routing packets. iDNS servers are valuable in this embodiment because they can be updated dynamically. This allows them to select a routing that avoids problems, if information regarding the problems is provided to them. In addition, each of RAN-SBs 208a-c includes federation buses 410a-c, respectively. Each of federation buses 410a-c includes two buses, one connects to EPC-SB 222a and the other to EPC-SB 222b. Therefore, all of RAN-SBs 208a-c and federated with both of EPC-SBs 222a-b. FIG. 6 illustrates service bus logical connections. However, federation buses 4101-c may take other configurations such as a central broker system or point-to-point distribution.

Figure 7:
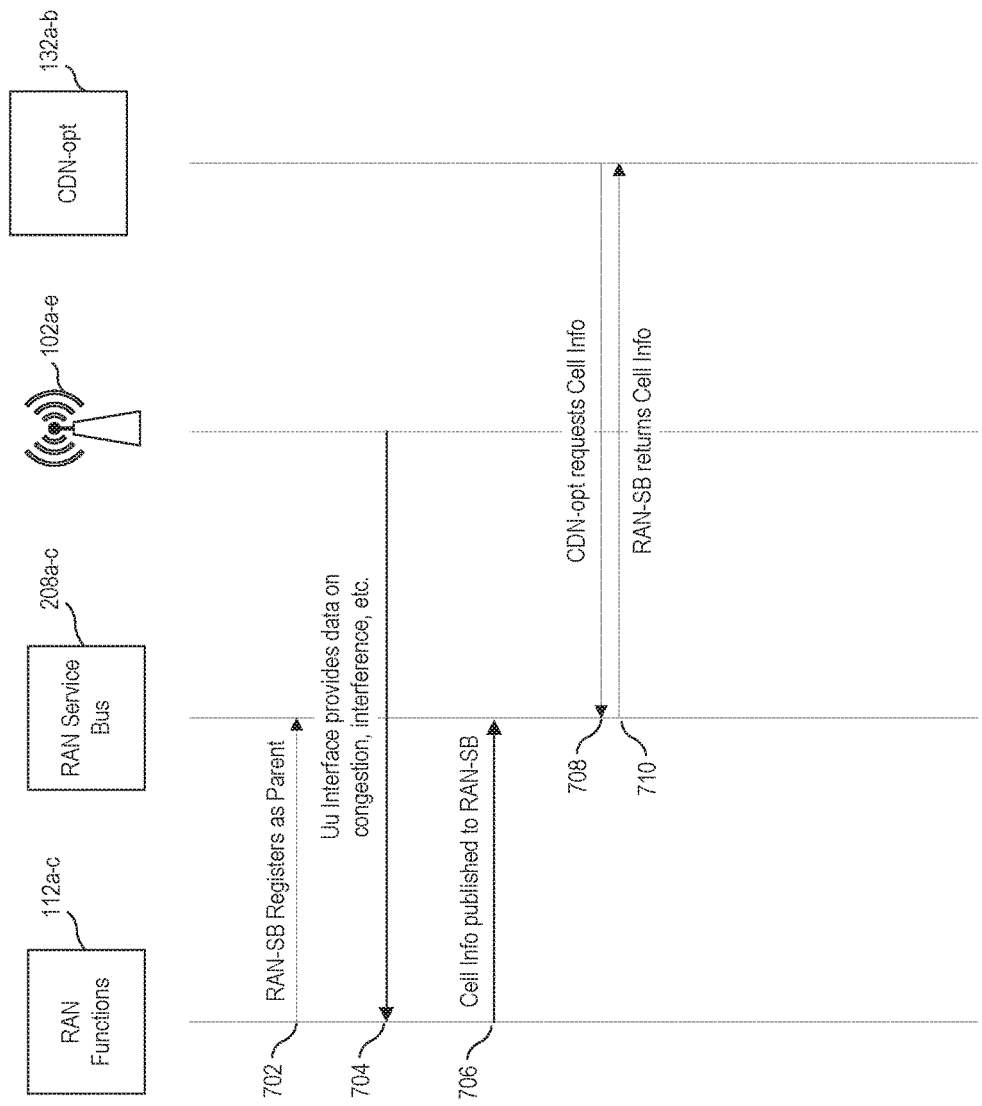
FIG. 7 illustrates a method embodiment of the present invention using cell congestion/load information in an embodiment such as network 600.

FIG. 7 illustrates a method embodiment of the present invention using cell congestion/load information in an embodiment like network 600. In step 702, one of RAN-SBs 208a-c is the parent of this service and EPC functions may subscribe to it via EPC-SB 222 (CDN-Opt 132a-b is an example application). In step 704, the Uu interface in transceivers 102a-e provides channel congestion, interference and other data that RAN functions 112a-c aggregate as load information (percentage, channels, other info). In step 706, the RAN functions 112a-c publish the information to RAN-SBs 208a-c. Because the service is federated, the subscribers in other domains are informed (e.g., <Cell-congestion> (op=PUBLISH, cell id=x, congestion level=y). In step 708, applications like CDN-opt 132a-b subscribe to the load information. In step 710, the RAN-SBs 208a-c forward this information and it is consumed by CDN-opt 132a-b to optimize providing cloud based information. Specifically, CDN-opt uses <Cell-Congestion> for overall and coarse grained information to optimize CDN services. It also uses ECN marking on upstream flows for fine-grained optimization of CDN services for specific flows.

Figure 8:
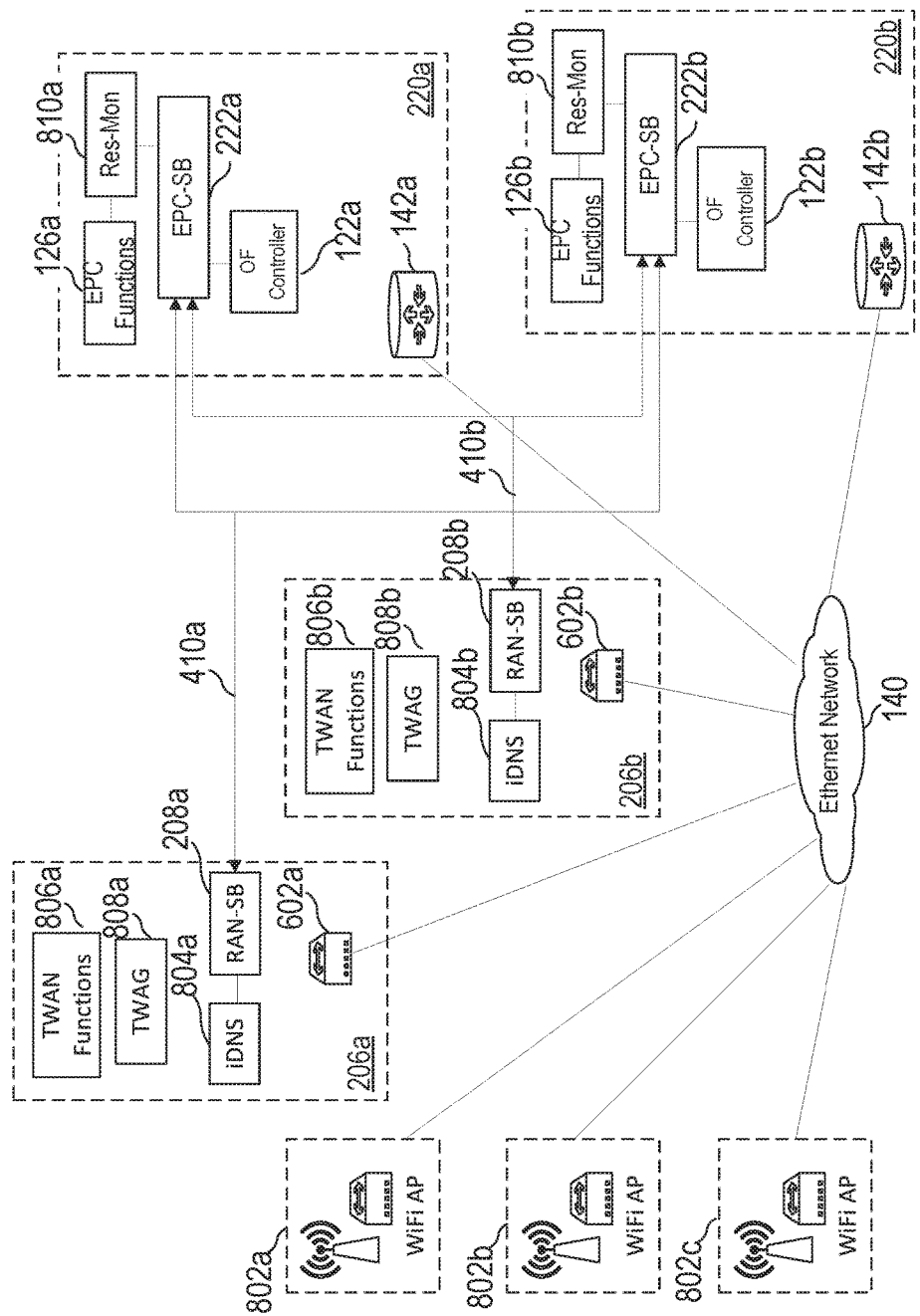
FIG. 8 shows another embodiment of the present invention related routing WiFi connections to 3GPP EPC (using S2a protocol)

FIG. 8 shows another embodiment of the present invention related to routing WiFi connections to 3GPP EPC (using S2a protocol). Current architectures using trusted wireless local area network (WLAN) access gateway (TWAG) do not consider dynamic load balancing among multiple packet data network gateways (PGWs) or other sites. With the embodiment of FIG. 8, the EPC 220a-b (AAA Proxy, PGW) dynamically uses a service bus 222a-b, respectively, through resource monitors 810a-b, respectively to distribute load information to applications that subscribe to it. In this configuration RANs 206a-b include TWANs 806a-b, respectively, along with TWAG 808a-b, respectively. In this case iDNSs 804a-b subscribe to EPC site load information. The iDNSs 804a-b then use configuration, topology and load information to return service records (SRV) and name authority pointer (NAPTR) responses.

Figure 9:
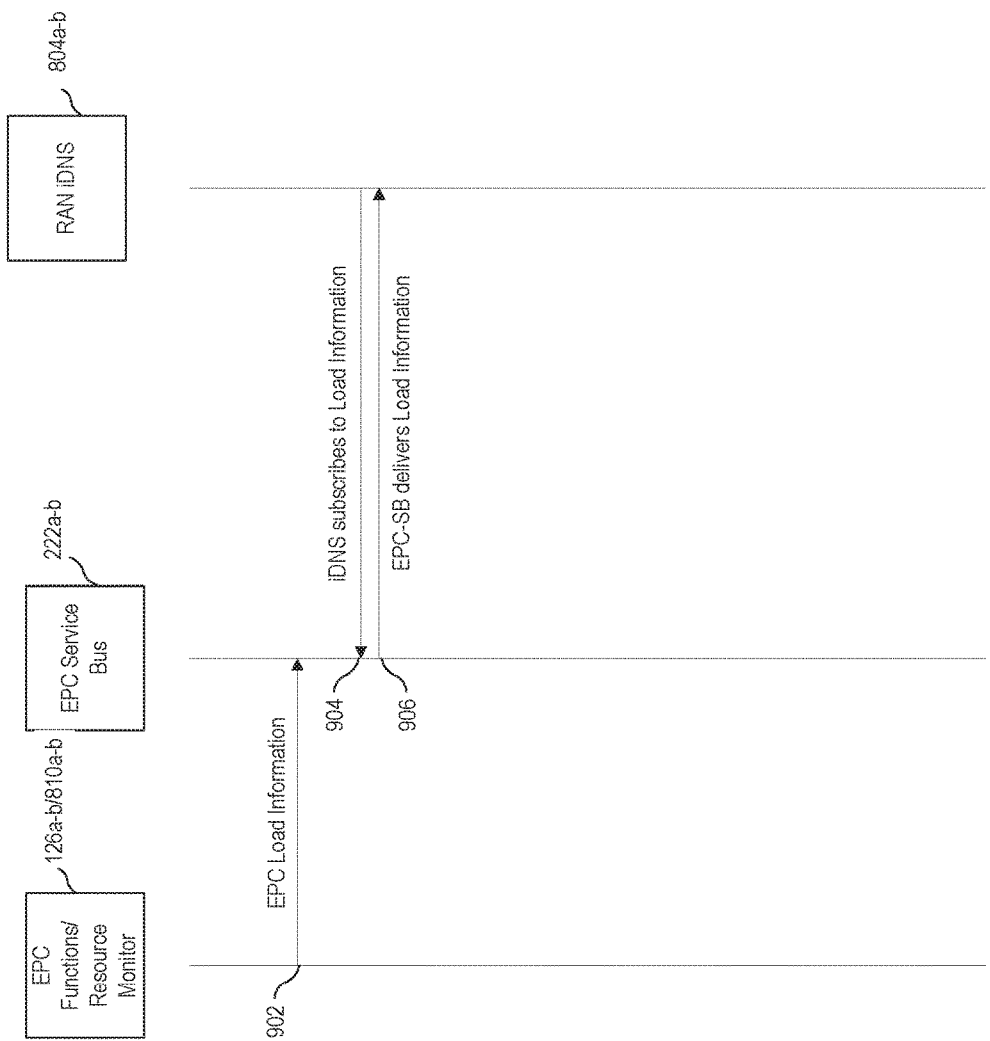
FIG. 9 illustrates a process of S2a-EPC (PGW) selection in the embodiment of FIG. 8.

FIG. 9 illustrates a process of S2a—EPC (PGW) selection in the embodiment of FIG. 8. In step 902, EPC functions 126a-b through resource monitors 810a-b continuously register load and related information of individual components. For this service, the EPCs 220a-b are the parents and the federated service bus provides the information to RAN applications that have registered. Resource monitors 810a-b calculate aggregate load level of their respective EPCs at regular intervals (in terms of percentage load, session handling capacity remaining, etc.) and load the service to the service bus (<EPC-Site-Load> (op=REGISTER, site=uEPC-x)). In step 904, iDNSs 804a-b subscribe to EPC site load, for each EPC site that cloud RANs 206a-b are respectively configured to interact with. Since this is a federated service, RAN-SB supports the subscription (<EPC-Site-Load> (op=SUBSCRIBE, site=uEPC-x)).

Figure 10:
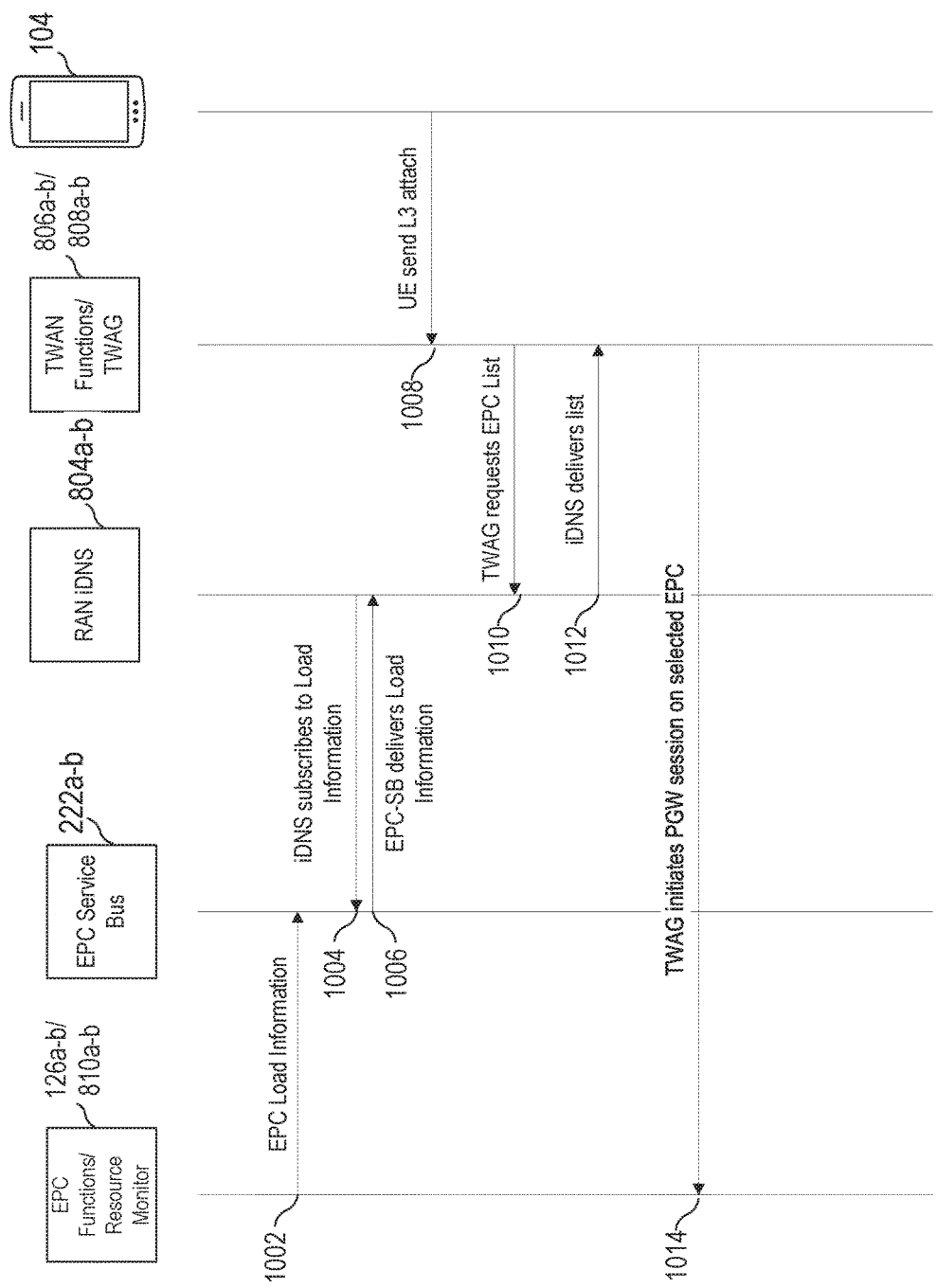
FIG. 10 illustrates another process of S2a-EPC (PGW) selection in the embodiment of FIG. 8.

FIG. 10 illustrates another process of S2a—EPC (PGW) selection in the embodiment of FIG. 8. In step 1002, resource monitors 810a-b aggregate load level information and publishes it at regular intervals (<EPC-Site-Load> (op=PUBLISH, site=uEPC-x, load=r). In step 1004, other applications (iDNS 804a-b in this example) subscribe to this information. In step 1006, EPC-SBs 222a-b distribute the load information to all applications that have subscribed to the load information. In step 1008, following authentication, UE 104 sends a L3 Attach to one of TWAGs 808a-b to set up a connection. For purposes of describing the next steps, it is assumed that TWAG 808a is attached to UE 104. In step 1010, TWAG 808a sends a request to iDNSs 804a for SRV/NAPTR translation for EPCs 220a-b. Since the RANs 206a-b are homed to multiple EPC locations, the same UE identity may be served by multiple EPC locations. iDNSs 804a provides an ordered list for TWAG 808a. In step 1014, assuming that gateway 142a is the gateway selected from the list provided by iDNS 804a, TWAG 808a sends Create Session request to gateway 142a.

Figure 11:
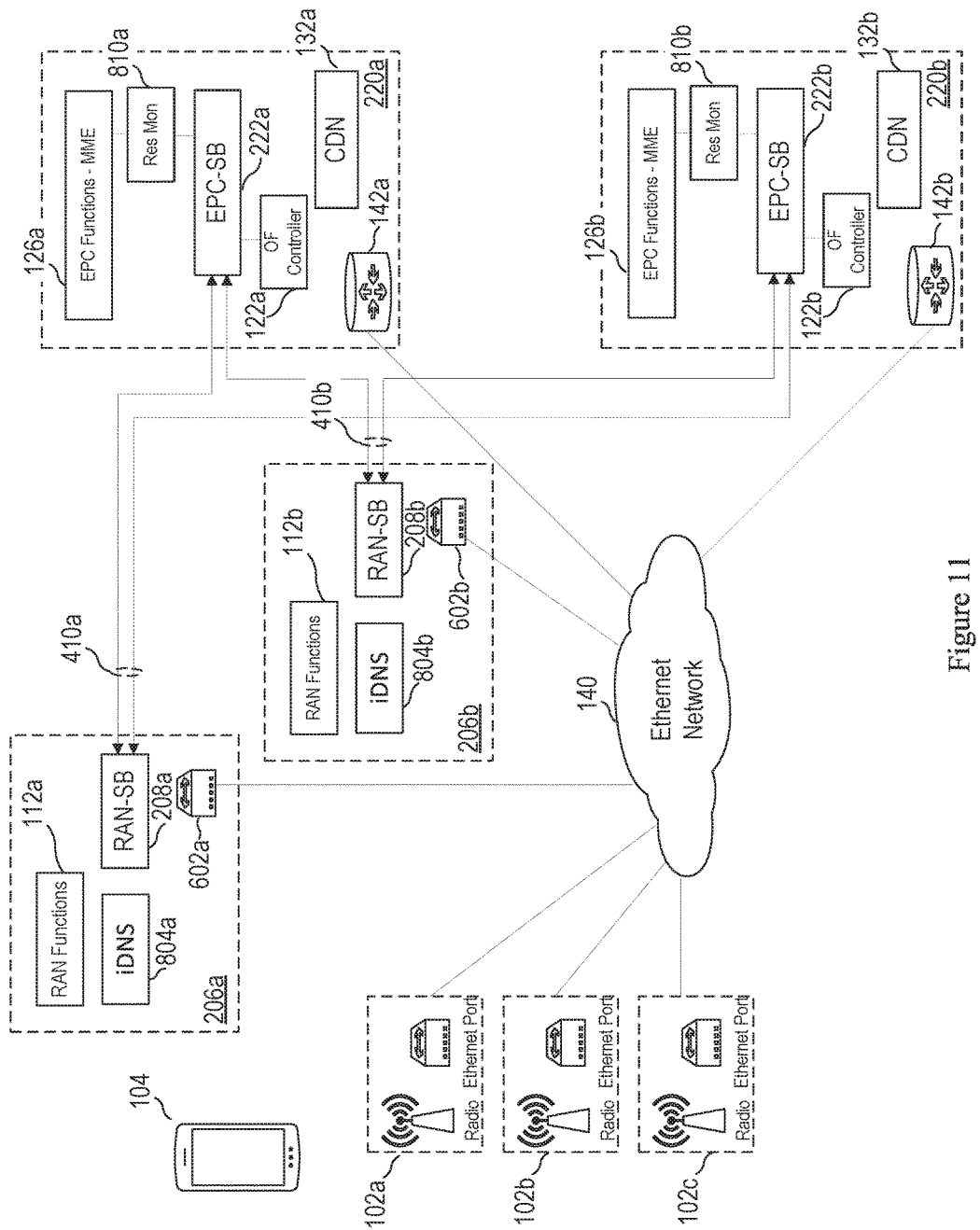
FIG. 11 shows an embodiment of the present invention to illustrate LTE-EPC selection.

FIG. 11 shows an embodiment of the present invention to illustrate LTE-EPC selection. FIG. 11 shows transceivers 102a-c connected through Ethernet network 140 for data transport. UE 104 connects through one of the transceivers and RANs 206a-b determine the routing of the data traffic using the following processes.

Figure 12:
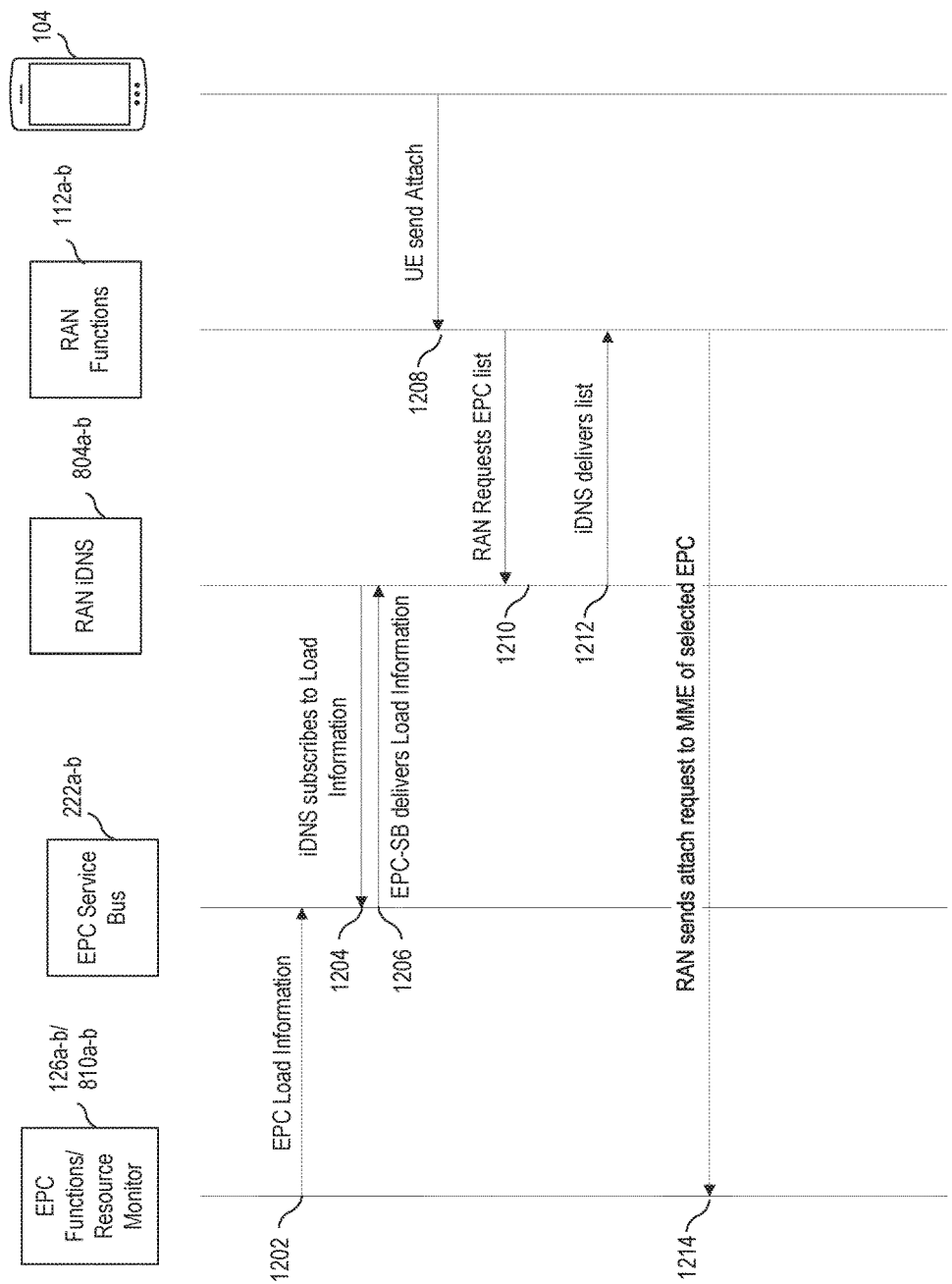
FIG. 12 shows a process for providing EPC loading information.

FIG. 12 shows a process for providing EPC loading information. In step 1202, EPC functions 126a-b continuously register load and related information of individual components to resource monitors 810a-b. For this service, the EPC is the parent and the federated service bus provides the information to RAN applications that have registered. Resource monitors 810a-b calculate aggregate load level of EPC at regular intervals (in terms of percentage load, session handling capacity remaining, etc.). Resource monitors 810a-b registers load service to the service bus (<EPC-Site-Load> (op=REGISTER, site=uEPC-x)). In step 1204, iDNSs 804a and/or 804b subscribes to EPC site load, for each EPC site that RANs 206a-b are configured to interact with. Since this is a federated service, RAN-SBs 208a-b support the subscription and in step 1206, the EPC-SBs deliver the load information (<EPC-Site-Load> (op=SUBSCRIBE, site=uEPC-x)). In step 1208, following authentication, UE 104 sends an Attach Request to at least one of RAN functions 112a-b to set up a session. In step 1210, the RAN functions 112a-b requests from the iDNS 804a-b the SRV/NAPTR translation for selecting an EPC. Since the RANs 206a-b are homed to multiple EPC locations, the same UE identity may be served by multiple EPC locations. RAN iDNS 804a-b provides an ordered list in step 1212. In step 1214, the RAN function responsible for the Attach Request sends the request to the EPC function 126a-b (MME) in the selected EPC 220a-b.

Figure 13:
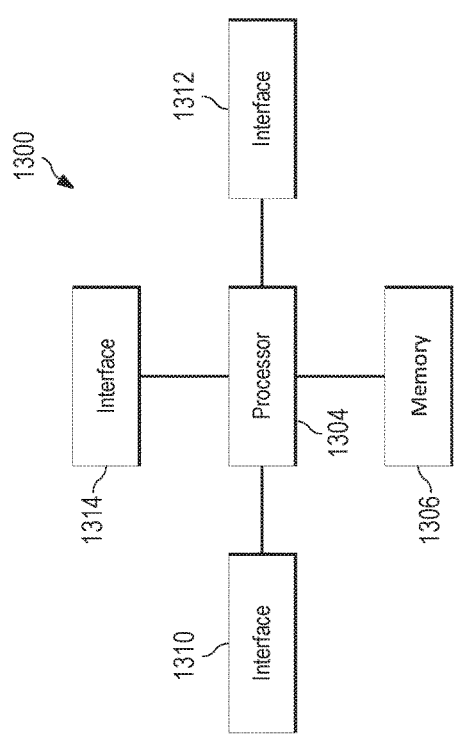
FIG. 13 illustrates a block diagram of an embodiment processing system 1300 for performing methods described herein, which may be installed in a host device.

FIG. 13 illustrates a block diagram of an embodiment processing system 1300 for performing methods described herein, which may be installed in a host device. For example, RAN 206 of FIG. 3 may be implemented the processing system 1300, as well as many other described components. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
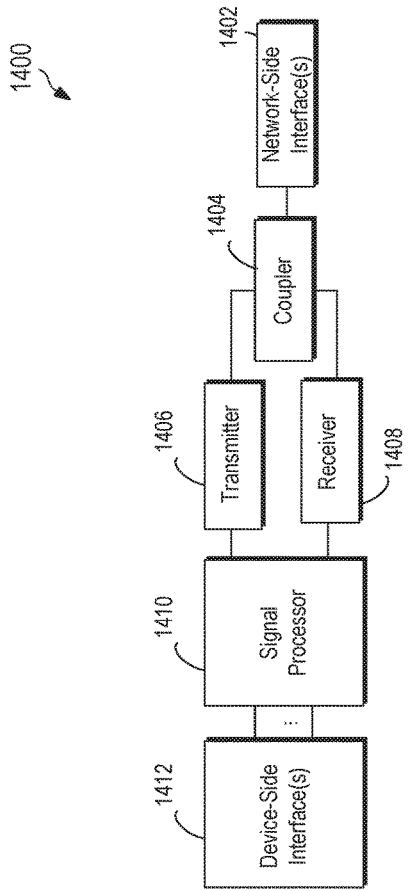
FIG. 14 illustrates a block diagram of a transceiver 1400 adapted to transmit and receive signaling over a telecommunications network.

In some embodiments, one or more of the interfaces 1310, 1312, 1314 connects the processing system 1300 to a transceiver adapted to transmit and receive signaling over the telecommunications network. FIG. 14 illustrates a block diagram of a transceiver 1400 adapted to transmit and receive signaling over a telecommunications network. The transceiver 1400 may be installed in a host device. Transceiver may be use to implement, for example, one or more of transceivers 102a-e of FIG. 6. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 600, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Further disclosed is a federated service bus means that comprises at least one processor; and at least one non-transitory computer readable storage medium storing programming for execution by the at least one processor, the programming including instructions to provide a federated service bus between an evolved packet core (EPC) and a radio access network (RAN), wherein the federated service bus provides information based on a parent-child relationship between the EPC and RAN on a per-federated service basis.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
subscribing, by a radio access network (RAN), with each of a plurality evolved packet cores (EPCs) for a service via a federation bus between the RAN and a corresponding EPC, wherein the federation bus connects a service bus of the RAN and a service bus of the corresponding EPC, and wherein the service includes load information of the corresponding EPC; and
receiving, by the RAN, information of a subscribed service from a corresponding EPC in the plurality of EPCs via the federation bus.

2. The method of claim 1, wherein the includes location information of a user equipment (UE).

3. The method of claim 1, further comprising selecting a packet data network (PDN) gateway (GW) in 3GPP S2a when there are equivalent PDN GWs in multiple sites based on the load information provided via the federation bus.

4. The method of claim 1, further comprising selecting one of the plurality of EPCs based on the load information provided via the federation bus.

5. The method of claim 1, further comprising balancing traffic over at least two EPCs and the RAN based on the load information received from the at least two EPCs over corresponding federation buses.

6. A method comprising:
subscribing, by an evolved packet core (EPC), with a first radio access network (RAN) for a first service via a first federation bus between the EPC and the first RAN, wherein the first federation bus connects a service bus of the EPC and a service bus of the first RAN, and wherein the first service includes cell congestion information; and
receiving, by the EPC, the cell congestion information of the first service from the first RAN via the first federation bus according to subscription of the EPC for the first service.

7. The method of claim 6, wherein the cell congestion information allows an application to obtain a congestion level of a cell.

8. The method of claim 6, wherein the cell congestion information of the first service is utilized by a content data network optimizer.

9. The method of claim 6, further comprising:
subscribing, by the EPC, with a second RAN for a second service via a second federation bus between the EPC and the second RAN, the second federation bus connecting the service bus of the EPC and a service bus of the second RAN; and
receiving, by the EPC, information of the second service from the second RAN via the second federation bus according to subscription of the EPC for the second service.

10. A radio access network (RAN) comprising:
at least one processor; and
at least one non-transitory computer readable storage medium storing programming for execution by the at least one processor, the programming including instructions to:
subscribe with each of a plurality evolved packet cores (EPCs) for a service via a federation bus between the RAN and a corresponding EPC, wherein the federation bus connects a service bus of the RAN and a service bus of the corresponding EPC, and wherein the service includes load information of the corresponding EPC; and
receive information of a subscribed service from a corresponding EPC in the plurality of EPCs via the federation bus.

11. The RAN of claim 10, wherein the service includes location information of a user equipment (UE).

12. The RAN of claim 10, wherein the programming comprises further instructions to select a packet data network (PDN) gateway (GW) in 3GPP S2a when there are equivalent PDN GWs in multiple sites based on the load information provided via the federation bus.

13. The RAN of claim 10, wherein the programming comprises further instructions to select one of the plurality of EPCs based on the load information provided via the federation bus.

14. The RAN of claim 10, wherein the programming comprises further instructions to balance traffic over at least two EPCs in the plurality of EPCs and the RAN based on load information received from the at least two EPCs over corresponding federation buses.

15. An evolved packet core (EPC) comprising:
at least one processor; and
at least one non-transitory computer readable storage medium storing programming for execution by the at least one processor, the programming including instructions to:
subscribe with a first radio access network (RAN) for a first service via a first federation bus between the EPC and the first RAN, wherein the first federation bus connects a service bus of the EPC and a service bus of the first RAN, and wherein the first service provides cell congestion information; and
receive the cell congestion information of the first service from the first RAN via the first federation bus according to subscription of the EPC for the first service.

16. The EPC of claim 15, wherein the cell congestion information allows an application to obtain a congestion level of a cell.

17. The EPC of claim 15, wherein the programming comprises further instructions to:
- subscribe with a second RAN for a second service via a second federation bus between the EPC and the second RAN, the second federation bus connecting the service bus of the EPC and a service bus of the second RAN; and
- receive information of the second service from the second RAN via the second federation bus according to subscription of the EPC for the second service.

* * * * *

UNITED STATES PATENT AND TRADEMARK OFFICE
CERTIFICATE OF CORRECTION

PATENT NO.        : 10,447,494 B2  
APPLICATION NO.   : 15/716294  
DATED             : October 15, 2019  
INVENTOR(S)       : Kaippallimalil Mathew John Page 1 of 1

It is certified that error appears in the above-identified patent and that said Letters Patent is hereby corrected as shown below:

In the Claims

Column 9, Line 43, Claim 2, delete "wherein the includes" and insert --wherein the service includes--.

Signed and Sealed this  
Third Day of December, 2019

Andrei Iancu  
*Director of the United States Patent and Trademark Office*